United States Patent [19]

Goldwasser et al.

[11] Patent Number: 4,559,598

[45] Date of Patent: Dec. 17, 1985

[54] METHOD OF CREATING TEXT USING A COMPUTER

[76] Inventors: Eric Goldwasser; Dorothy Goldwasser, both of 993 Barberry Rd., Yorktown Heights, N.Y. 10598

[21] Appl. No.: 468,493

[22] Filed: Feb. 22, 1983

[51] Int. Cl.⁴ .............................................. G06F 15/21
[52] U.S. Cl. ..................................... 364/419; 364/900
[58] Field of Search ................... 364/419, 200, 900; 340/707, 708, 365 P; 434/167, 169, 308; 400/98, 95

[56] References Cited

U.S. PATENT DOCUMENTS

| | | | |
|---|---|---|---|
| 4,190,833 | 2/1980 | Bejting et al. | 340/707 |
| 4,193,119 | 3/1980 | Arase et al. | 364/900 |
| 4,195,338 | 3/1980 | Freeman | 364/200 |
| 4,198,623 | 4/1980 | Misek et al. | 340/365 P |
| 4,247,906 | 1/1981 | Corwin | 364/900 |
| 4,386,232 | 5/1983 | Slater | 178/18 |
| 4,406,626 | 9/1983 | Anderson et al. | 364/419 |
| 4,438,505 | 3/1984 | Yanagiuchi et al. | 364/419 |
| 4,456,973 | 6/1984 | Carlgren et al. | 364/900 |
| 4,464,070 | 8/1984 | Hanft et al. | 400/98 |
| 4,481,603 | 11/1984 | McCaskill et al. | 364/900 |

OTHER PUBLICATIONS

Cossalter et al., "A Microcomputer-Based Communication System for the Non-Verbal Severely Handicapped" Eurocon '77 Proceedings on Communications, Venice, Italy, May 1977, pp. 196-202.

*Primary Examiner*—Michael R. Fleming
*Attorney, Agent, or Firm*—Karl F. Milde, Jr.

[57] ABSTRACT

A method of creating text using a computer having a display screen and a pointing mechanism for identifying locations on the display screen. The method involves displaying a list of commonly used words on the screen so that the user may select the words to be used in the text by successively pointing to them. The computer responds to the pointing mechanism and displays on the screen a line of text comprising the identified words in their successive order of selection.

11 Claims, 2 Drawing Figures

```
this is the eleventh line of text.
Now is the time for all good men to
come to the aid of their country.

a    each if   on    so    up    now
all       in   of    some        time
and  for  is   one         very  good
are  from it   or    that        men
as             out   the   was   come
at   go   just       their we    aid
               put   them  were  country
be   had  know       then  what
but  have      quiet there when
by   he   like       these will
     her       right they  with
can  his  make       this  word
     how  my   said  to
do             see   too   you
did  I    not  she   two   your

Q W E R T Y U I O P   1 2 3 4 5 6 7 8 9 0

A S D F G H J K L   end Cap Par s ed ing

! Z X C V B N M , . ? ' "  - - edit erase
```

```
         this is the eleventh line of text.
         Now is the time for all good men to
        come to the aid of their country.

a    each if  on      so      up   now
        all        in  of      some         time
        and  for   is  one             very good
        are  from  it  or      that         men
        as             out     the     was  come
        at   go    just        their   we   aid
                       put     them    were country
        be   had   know        then    what
        but  have      quiet   there   when
        by   he    like        these   will
             her       right   they    with
        can  his   make        this    word
             how   my  said    to
        do             see     too     you
        did  I     not she     two     your

Q W E R T Y U I O P  1 2 3 4 5 6 7 8 9 0

A S D F G H J K L  end  Cap Par s ed ing

! Z X C V B N M , . ? ' " - - edit erase
```

FIG. 1

```
         this is the second line. As you might
         have guessed this is the third line. The
         fourth line is, you got it, this very
         one. By this time I don't have to tell
         you what line this is because you
         probably can figure it out for yourself.
         But I want to direct your attention to
         the following line which, if I counted
         correctly, is the tenth line. And then
         this is the eleventh line of text.
          Now is the time for all good men to
         come to the aid of their country.

ADD_WORDS     ALIGN    PRINT    SAVE    RETURN

INSERT_LETTER   INSERT_WORD    TOP      UP

DELETE_LETTER   DELETE_WORD    BOTTOM   DOWN

Q W E R T Y U I O P  1 2 3 4 5 6 7 8 9 0

A S D F G H J K L   end Cap Par (@#$%&*)

! Z X C V B N M , . ? ' " - - :;-/ erase
```

FIG. 2

METHOD OF CREATING TEXT USING A COMPUTER

BACKGROUND OF THE INVENTION

This invention is a new way of creating text using a pointing mechanism such as a light pen or touch sensitive display screen to point to words that a program causes to be displayed on the screen, thereby adding them to the text.

The standard method of creating text is by typing on a keyboard. This method requires considerable skill to be able to create text at reasonably high rates. It typically takes adults about 100 hours of training to attain a typing speed of about 40 words per minute. Young children are not taught to type because they do not have the mental and/or physical dexterity required.

As personal computers become less expensive in the next few years, we can expect that almost anyone who needs to create text will have access to a computer so that he can use the word processing capabilities of the computer to create the text. Further, since word processing offers great advantages over both handwriting and standard typing on paper via a standard typewriter, we can expect that using a computer will be the method of choice for creating text. Hence a method of creating text at a reasonably high rate using a computer, that requires little skill or training will be very advantageous.

SUMMARY OF THE INVENTION

An object of this invention is to provide a method of creating text using a personal computer, which method is easy to learn but holds the possibility of permitting both young children and adults to create text at higher rates than present methods permit.

Another object of this invention is to provide a method of creating text which allows a person to use a word even if he is not sure of the correct spelling of that word.

Still another object of this invention is to provide a method of editing using a natural pointing method rather than typed commands or cursor movements.

These objects, as well as other objects which will become apparent from the discussion that follows, are achieved, according to the present invention, by suitably programming a computer, having both a display screen and a pointing mechanism for identifying locations on the display screen, to enable the computer to carry out a process with the following steps:

(a) displaying on the screen a list of language words for selection by the computer user;

(b) identifying successive ones of the words in response to the pointing mechanism as these words are selected by the user by pointing to their respective locations on the screen; and (c) displaying on the screen a line of text comprising the identified words in their successive order of selection.

Thus, when a person uses the programmed computer to create text on the display screen, he (or she) points to successive ones of the listed words, which are preferably arranged alphabetically on the screen. The computer then notes which words were pointed to and performs the appropriate processing to display a line or lines of text containing these words in proper order. Advantageously, the line(s) of text can be displayed at either the top or the bottom of the screen, so as to leave room on the main part of the screen for the original "library list" of words.

According to a particular feature of the present invention a list of alphanumeric characters is also displayed, so that words which are not contained in the "library list" may be spelled out, character by character, by pointing to their successive characters, in turn, in the manner described below.

Typically the first screen that is displayed (i.e. the first set of words and characters) by the computer will contain the most common words so that the person can add one of these words to the text by pointing to it, with one pointing action. If the person wants to add a word that is not on the first screen, he can point to one or more words or characters that will cause the computer to display a new screen on which the word that he wants to add is present. Typically he would point to the first letter of the word he wants. The computer will then display a second screen of words all of which start with that letter and which are in some sense the most common words that start with that letter. Hence this second screen is likely to contain the word that he has in mind. If it does, he can add the word to the text by pointing to it. He will then have added that word with a total of two pointing actions. If this second screen does not contain the word he wants, he would point (on this second screen) to the second letter of the word he wants and the computer will then display a third screen of the most common words that start with the first letter followed by the second letter. He can continue spelling out the word by pointing to succeeding letters until a screen is displayed which contains the word he wants or he has spelled out the entire word. If the word appears he can point to it and it will be added to the text and the first screen will be displayed so that he can choose his next word from among the most common words. If the word is completely spelled out he can point to an end of word indicator and the word will be added to the text and to one of the screens so that the next time he wants to use that word he will not have to spell it out again.

To edit the text he can point to an edit indicator and the computer will display a portion of the text along with edit command words. He can then perform the editing functions (such as "delete", "insert", etc.) by pointing to the edit command words and the text words that the edit commands should operate on.

The pointing mechanism can be a light pen, or a touch sensitive display that registers the position on the screen that a fingertip or other pointing object touches, or some other way of selecting a point on the screen. The computer can also be constructed to register several points that are pointed to almost simultaneously by several fingers or other pointing objects. Hence a person could point to the first two letters of a word almost simultaneously with two fingers, or he could point to a letter and a position on the screen at which he expects a word to appear as a result of pointing to the letter. This method according to the invention makes it possible for people to create text at very high rates.

The foregoing and other objects, features and advantages of the invention will be apparent from the following more particular description of the preferred embodiments of the invention, as illustrated in the accompanying drawing.

BRIEF DESCRIPTION OF THE DRAWING

FIG. 1 of the drawing illustrates a preferred format for the display screen of a computer which is programmed to operate according to the method of the present invention.

FIG. 2 illustrates an edit screen format for use with the method of the present invention.

DESCRIPTION OF THE PREFERRED EMBODIMENT

The preferred embodiment of the present invention will now be described in connection with FIGS. 1 and 2 of the drawing. This embodiment utilizes the following computer equipment, which is available commercially from IBM Corp., Boca Raton, Fla.:

IBM Personal Computer with at least 64K of memory;
At least one diskette drive;
A graphics CRT display;
A light pen.

The preferred embodiment also utilizes a computer program, written in BASIC language and designed to be supported by the IBM Disk Operating System (DOS). A complete listing of the instructions of this program is set forth in the attached Appendix. This program is entitled "Pointwriter" TM.

The Pointwriter TM text processing program operates to carry out 25 different functions. These are:

1. Add word to text and most used words columns.
2. Add letter to partially spelled word and get new screen of words.
3. Add fully spelled word to text and most used words columns.
4. Add suffixes "s", "ed", and "ing".
5. Add other suffixes.
6. Add special characters (including numbers and punctuation).
7. View text.
8. Replace character(s).
9. Delete character(s).
10. Insert character(s).
11. Delete word(s).
12. Undo last action.
13. Insert word(s).
14. Capitalize.
15. Paragraph.
16. Save text and most used words columns.
17. Print text.
18. Align text to eliminate short lines.
19. Stop editing and return to main screen.
20. Stop edit function.
21. Use words that you have previously used.
22. Start a new document or add to an old document.
23. Use old most used words columns.
24. Modify screens (for teacher).
25. Tutorials.

1. Add word to text and most used words columns.

The Pointwriter program generates a main image on the display screen in the format illustrated in FIG. 1. This image or "screen" is divided into three areas:

The first three rows contain the last three lines of text;
The bottom three rows (actually the bottom five because two are blank) contain the alphabet, special characters and command words; and
The middle area consists of a left part of fifteen rows by twenty-nine columns and a right part of fifteen rows by ten columns. The left part contains seventy of the most commonly used English words. The right part contains the fifteen text words that were used most often in the text, but are not among the seventy.

To add a word that is on this screen (except for the command words) to the text you just point to the word. All the characters to the left and right, including the character pointed to, up to the first space will be added to the text. Then a space character will be added to the text so that the next word added will be separated from this word by a space. If the word is not one of the seventy, it may also be added to the right hand column of fifteen most often used words. More precisely, its new frequency (after incrementing its frequency by one) will be compared to the frequencies of the words in that column and if its frequency outranks one of the others' it will replace it. If there are less than fifteen words in the column it will be added to the column. There are also twenty-five other columns of most used words, one for each letter except "x". These columns appear, as we shall see when we discuss the next function-"Add letter to partially spelled word . . . ", when the middle area of the main screen is replaced by a list of words all starting with the letter. The word will also be added to the column of fifteen most used words which begin with its first letter.

2. Add letter to partially spelled word and get new screen of words.

If a word that you want to add to the text is not on the main screen of seventy words or in the column of fifteen most used text words you should point to its first letter in the screen displayed keyboard on the left side of the bottom three rows. The words in the middle area of the screen will immediately be replaced with words that begin with that letter. On the left (fifteen row by twenty nine character) part will be between ten and fifty very common words that begin with that letter. On the right (fifteen row by ten character) part will be up to fifteen words that have been used most frequently in the text that begin with that letter. If the word you want is still not on the screen you should point to its second letter. Again the words in the middle area will be replaced with words that begin with these two letters (the first followed by the second). If you point to a third or fourth letter one of two things will occur. If there are many words that begin with that sequence of three or four letters then a new set of words all starting with that sequence will appear. But if there are not many such words then all the words that do not begin with that sequence will be blanked out so that it will be easier to see if your word is on the screen. As you continue to spell out a word the words that don't begin with the letters that you have pointed to will continue to be blanked out so that if you fully spell the word only that word (and perhaps additional words that differ from it by an added suffix) will remain. As you spell out a word the letters you point to are added to the text so that you can see how much of it you have spelled. At any point that you notice the word and point to it, it will be added to the text replacing the partially or fully spelled word. Then the first screen of seventy words will reappear so you can choose your next word.

3. Add fully spelled word to text and most used word columns.

If you have fully spelled a word because it was never displayed, you must point to "end" on the next to last row to tell the program that it has no more letters. It will then be added to the text and possibly to the columns of fifteen most used words. Sometimes it will go into the column of most used words on the first screen.

Usually it will go into the column of fifteen most used words that begin with its first letter so that when you want to use it again it will appear on the screen after you point to its first letter.

4. Add "s", "ed", and "ing" to the last word of text.

By pointing to "s", "ed", or "ing" on the right side of the next to last row, these suffixes may be added to the last word displayed.

5. Add other suffixes to the last word of text.

By first pointing to the left arrow on the bottom row to position the cursor immediately after the last text word, and then spelling the suffix and pointing to "end" other suffixes may be added. The full word including the suffix will be ranked by frequency of use for possible inclusion in the most used words columns.

6. Add special characters (including numbers and punctuation).

First position the cursor if necessary by pointing (perhaps repeatedly) to the arrows on the bottom row, then if the character is on the main screen point to it. If it is not on the main screen you should first point to "edit" on the bottom row. The edit screen will appear. Point to the character and you will immediately be returned to the main screen.

An example of the edit screen is shown in FIG. 2. Notice that the last twelve lines of text are displayed along with three additional rows of commands and that special characters have replaced the suffixes and the "edit" command on the bottom two rows.

7. View the text.

Only the last three lines of text are displayed on the main screen. To view the rest of the text point to "edit" to get the edit screen. You will initially see the last twelve lines of text. Point to TOP, BOTTOM, UP, and DOWN to scroll the text. TOP will display the first twelve lines of text and BOTTOM the last twelve lines. UP and DOWN cause a scroll of one line. Pointing to the number n immediately after pointing to UP or DOWN will cause an additional scroll of n-1 lines.

8. Replace a character.

You may replace a character by getting to the edit screen and first pointing to the character you want to replace. The cursor will move to that character. Then point to the character in the last three rows that you want to replace it with. Alphabetic characters will go in as lower case. To make it upper case capitalize it. After the replacement the cursor will move one character to the right so you can continue replacing characters easily.

9. Delete a character.

You may delete a character by getting to the edit screen and first pointing to the character and then pointing to DELETE LETTER. The characters to the right will be moved left one character so you can delete additional characters by repeatedly pointing to DELETE LETTER.

10. Insert a character.

You may insert a character by getting to the edit screen and pointing to the character before which the insertion should take place and then pointing to INSERT LETTER. Then point to the character you want to insert. It will go into the cursor position and the character that was at that position and the characters to the right will move one character to the right as will the cursor so you can easily continue inserting characters.

11. Delete words.

You may delete words by getting to the edit screen and pointing to DELETE WORD. Any words that you point to after that will be deleted.

12. Undo your last action.

You may undo your last action by pointing to "erase" on the bottom row.

13. Insert words.

You may insert words by getting to the edit screen and pointing to INSERT WORD. You will be asked to point to the word before which you want to insert. After you point to that word the main screen will reappear with the top three rows containing the text before that word on row one and the text after that word on row three and only the cursor on row two. You can insert as many words as you want just as you would add words to the end of the text. When you are finished inserting, point to the end. The text is aligned and then the last three lines of text will appear and you can continue.

14. Capitalize a character, by pointing to "Cap" and then the character. On the main screen you must point to "Cap" before each character, but on the edit screen you can point to "Cap" once and then a succession of characters.

15. Start a new paragraph, by pointing to "Par". On the main screen this will put the cursor at the beginning of the next text line indented one character. On the edit screen you will be asked which word should start a new paragraph and when you point to a word a new paragraph will be created and the text will be realigned accordingly.

16. Save your document on disk, by pointing to SAVE on the edit screen. You will be asked to spell a title. You should point to "end" after spelling a title. The columns of most used words will also be saved under this title.

17. Print your document on the printer, by pointing to PRINT on the edit screen.

18. Eliminate short lines caused by deletions, by pointing to ALIGN on the edit screen.

19. Stop editing and return to the main screen, by pointing to RETURN on the edit screen.

20. Stop edit functions, by pointing to "end" on the edit screen. In some cases you can point to another edit command to automatically stop the previous edit function, but in the case of DELETE WORD you must point to "end" before attempting to position the cursor for another edit function since pointing to a text word while in DELETE WORD mode will delete the word!

21. Use words that you have previously used, by pointing to them in the text or the columns of most used words. If the word you want to use is in the last three lines of text it will be in the main screen text area and you can add it to the text by pointing to it. If it is not in the last three lines you can go to the edit screen and point to ADD WORDS. Then when you point to text words they will be added to the text instead of the cursor being positioned at the word.

22. Start a new document or add to an old one, by pointing to NEW DOC or to one of the titles that is displayed when you start the Pointwriter program. The initial Pointwriter program screen contains instructions and the command START. When you point to START the titles of previously saved documents will be displayed.

23. Use old most used words columns.

After you point to a title you will be asked if you want to use the most used words columns associated with that document or start out fresh. If you start a new document you will be asked if you want to use the most used words columns associated with one of your stored documents.

24. Modify word screens.

The teacher can modify any of the word screens (of fifteen rows by twenty nine characters) by adding and/or deleting words. The new screen can then be saved in place of the supplied screen.

25. Tutorials

There are two tutorials. One presents a story and asks a child to recreate it. As the child successfully recreates the words they are highlighted so the child can see which word to work on next. The other presents a story and recreates it itself showing the child the proper pointing actions by highlighting the words, letters, and command words in the proper sequence.

There has thus been shown and described a novel method of creating text which fulfills all the objects and advantages sought therefor. Many changes, modifications, variations and other uses and applications of the subject invention will, however, become apparent to those skilled in the art after considering this specification and the accompanying drawing which discloses preferred embodiments thereof. All such changes, modifications, variations and other uses and applications which do not depart from the spirit and scope of the invention are deemed to be covered by the invention which is limited only by the claims which follow.

APPENDIX

```
1 'PointWriter (C) Eric Goldwasser, January, 1983
5 'ON ERROR GOTO 10000
10 'initialize
20 KEY OFF:WIDTH 40:CLS:LOCATE 1,1
21 PRINT " Hello, my name is PointWriter. You can"
22 PRINT "use me to write stories by pointing to"
23 PRINT "words with the light pen. If you want"
24 PRINT "to use a word that is not on the screen"
25 PRINT "just point to the first letter and a"
26 PRINT "new screen will appear. The word might"
27 PRINT "be on the new screen. If the word is"
28 PRINT "not on the new screen then point to the"
29 PRINT "second letter and a new screen will"
30 PRINT "appear. You might have to spell the"
31 PRINT "word by pointing to all its letters."
32 PRINT "Then you should point to end' to tell"
33 PRINT "me that there are no more letters in"
34 PRINT "the word."
35 PRINT " I am loading my memory with words."
36 PRINT "Please wait for me to finish loading my"
37 PRINT "memory. I will beep when I'm finished."
40 DEF SEG=&HBBA0:BLOAD"DISPLAY",0:DISPLAY%=0
42 DEF SEG=&H3C00:BLOAD"alpmain",0
44 SCRN$="x":R%=21:C%=1:O%=0:L%=400:SH%=&H3C:SL%=0:DEF SEG=&HBBA0
46 CALL DISPLAY%(SH%,SL%,O%,L%,R%,C%)
50 DEF SEG=&HBBB0:BLOAD"fprint",0:FPRINT%=&H100
51 DEF SEG=&HBBC0:BLOAD"rnk12",0:RNK12=&H200
52 DEF SEG=&H3F00
53 FOR I=0 TO &H557:POKE I,32:NEXT
54 FOR I=&H90 TO &H9B:POKE I,122:NEXT
55 FOR I=&H558 TO &H5C9:POKE I,0:NEXT
56 POKE &H564,122
57 POKE &H5C9,12
59 DEF SEG=&HBBE0:BLOAD"prt15",0:PRT12=&H400
60 DEF SEG=&H1800:BLOAD"az",0
61 DEF SEG=&H2000:BLOAD"abwr1",0
62 DEF SEG=&H2A00:BLOAD"abwr2",0
63 DEF SEG=&H3800:BLOAD"canthe",0
64 DEF SEG=&H3B00:BLOAD"coxx",0
67 DEF SEG=&H3D00:BLOAD"edscrn",0
68 DEF SEG=&H3C00:BLOAD"alpmain",0
70 'entry
71 UCALPH$="ABCDEFGHIJKLMNOPQRSTUVWXYZ"
72 TWOLET1$="ab ac ad af ag ai al am an ap ar as at au av aw ba be bi bl bo br b
   u ca ce ch ci cl co cr cu cy da de di dr du ea el em en es ev ex fa fe fi fl fo
   fr fu ga ge gi gl go gr gu ha he hi ho hu hy id il im in la le li lo lu ma me mi
   mo mu my"
73 TWOLET2$="na ne ni no nu ob oc of on op or ou pa pi pl po pr pu ra re ri ro r
   u sa sc se sh si sk sl sm sn so sp sq st su sw ta te th ti to tr tu tw ty wa we
   wh wi wo wr"
74 THRLET$="can car com cox cou ins int inv par pre pro rea rel res str the"
75 DIM TXT$(100):DIM S15$(20):DIM OTXT$(100)
```

```
76  BEEP:LOCATE 19,1:PRINT "OK I'm finished. You can start by"
77  PRINT "pointing to START'"
78  GOSUB 4000
79  IF NOT(Y=20 AND X 14 AND X 20) THEN 78
80  DELAY=1:CLS:CR=1:LCR=1:EOW=0:PWRD$="":TXT$(CR)="    ":FPRINT%=&H100:RNK12=&H20
0:PRT12=&H400
81  LOCATE 11,1:PRINT SPACE$(39);:LOCATE 11,11:INPUT"Enter title";TITLE$
82  IF TITLE$="" THEN 88
83  OPEN TITLE$+".txt" FOR INPUT AS 1
84  INPUT#1,TXT$(CR):TXT$(CR)=" "+TXT$(CR)
85  IF EOF(1) THEN 88
86  CR=CR+1
87  GOTO 84
88  LOCATE 12,11:INPUT"Use old words? Y or N";UOW$
89  IF UOW$="y" THEN 18000
90  LOCATE 1,2,1,0,7
95  SCRN$="x":R%=21:C%=1:O%=0:L%=400:SH%=&H3C:SL%=0:DEF SEG=&HBBA0
97  CALL DISPLAY%(SH%,SL%,O%,L%,R%,C%)
98  GOSUB 9000
100 GOSUB 2000 'display main screen
102 PWRD$="":LPWRD$=""
105 CALL PRT12(C%)
110 GOSUB 3000 'position cursor
120 GOSUB 4000 'get pen
130 IF NOT(Y=23 AND X 24 AND X 28) THEN 140 'Cap
132 CAP=1
134 LOCATE 23,25
136 GOTO 120 'get pen
140 IF NOT(Y=23 AND X 28 AND X 32) THEN 150 'Par
142 CR=CR+1
144 TXT$(CR)="   "
145 GOSUB 9000
146 GOTO 110 'position cursor
150 IF NOT(Y=25 AND X 25 AND X 28) THEN 160 'left arrow
151 IF LEN(TXT$(CR)) 2 THEN 120
152 TXT$(CR)=LEFT$(TXT$(CR),LEN(TXT$(CR))-1)
154 GOTO 110 'position cursor
160 IF NOT(Y=25 AND X 27 AND X 31) THEN 170 'right arrow
162 IF LEN(TXT$(CR)) 39 THEN TXT$(CR)=TXT$(CR)+" "
164 GOTO 110 'position cursor
170 IF NOT((Y=21 AND X 20) OR (Y=23 AND X 31) OR (Y=25 AND X 15 AND X 26) OR (Y=
25 AND X 3)) THEN 180 'spec char(s)
172 TXT$(CR)=LEFT$(TXT$(CR),LEN(TXT$(CR))-1)
173 IF Y=23 AND X 35 AND X 37 AND RIGHT$(TXT$(CR),1)="e" THEN TXT$(CR)=LEFT$(TXT
$(CR)),LEN(TXT$(CR))-1)
174 GOSUB 5000 'get word from screen
175 GOSUB 8000 'add word to text and save old text
176 GOSUB 6000 'check for end of line
177 GOSUB 9000 'print text
178 GOTO 110 'position cursor
180 IF NOT(Y=25 AND X 30 AND X 35) THEN 200
181 LR=CR
182 GOTO 500 'edit
200 IF Y 3 OR CAP=0 THEN 250 'capitalize
202 CAP=0
204 IF SCREEN(Y,X)=32 AND X 40 THEN X=X+1
205 IF SCREEN(Y,X) 97 THEN 110 'not lower case alpha
206 GOSUB 1000 'save last 3 lines of old text and calculate row
208 MID$(TXT$(CR+Y-NR),X)=CHR$(SCREEN(Y,X)-32)
210 GOSUB 9000 'print text
212 GOTO 110 'position cursor
250 IF NOT(Y 21) THEN 310 'word
252 GOSUB 5000 'get word from screen
253 IF SCRN$  "x" THEN RNKWRD$=WRD$+SPACE$(15-LEN(WRD$)):RNKWRD$=LEFT$(RNKWRD$,1
2):CALL RNK12(RNKWRD$):GOSUB 4500
254 GOSUB 6000 'check for end of line
256 GOSUB 8000 'add word to text and save old text
258 GOSUB 9000 'print text
260 GOTO 100 'display main screen
310 IF NOT(Y 21) THEN 320 'word
312 GOSUB 5000 'get word from screen
313 IF SCRN$  "x" THEN RNKWRD$=WRD$+SPACE$(15-LEN(WRD$)):RNKWRD$=LEFT$(RNKWRD$,1
```

```
2):CALL RNK12(RNKWRD$):GOSUB 4500
314 GOSUB 6000 'check for end of line
316 GOSUB 8000 'add word to text and save old text
318 GOSUB 9000 'print text
319 GOTO 100 'display main screen.
320 IF NOT(Y=23 AND X 20 AND X 24) THEN 330 'end of word'
321 IF INSWRD=1 AND PWRD$="" THEN 880
322 FOR FBFR=1 TO 15
323 IF LEN(TXT$(CR)) FBFR+1 THEN 326
324 IF MID$(TXT$(CR),LEN(TXT$(CR))-FBFR,1)=" " THEN 326
325 NEXT
326 LWRD$=RIGHT$(TXT$(CR),FBFR):WRD$=PWRD$
327 IF SCREEN(NR,LEN(TXT$(CR)))  32 THEN TXT$(CR)=LTXT$:WRD$=LWRD$+PWRD$
328 IF SCRN$  "x" THEN RNKWRD$=WRD$+SPACE$(15-LEN(WRD$)):RNKWRD$=LEFT$(RNKWRD$,1
2):CALL RNK12(RNKWRD$):GOSUB 4500
329 GOSUB 6000:GOSUB 8000:GOSUB 9000:GOTO 100
330 IF NOT(Y 20 AND X 20) THEN 350 'alpha char
332 GOSUB 5000 'get word from screen
334 IF PWRD$="" THEN GOSUB 7000 ELSE IF LEN(PWRD$)=1 THEN GOSUB 7500 ELSE IF LEN
(PWRD$)=2 THEN GOSUB 8500 ELSE IF PWRD$="con" AND WRD$="T" THEN GOSUB 8990
336 LPWRD$=PWRD$
338 PWRD$=PWRD$+CHR$(ASC(WRD$)+32)
339 SCRN$=PWRD$
340 GOSUB 6500 'check end of line with pwrd
341 GOSUB 3000 'position cursor
342 PRINT PWRD$;
344 GOSUB 3500 'position cursor pwrd
346 GOTO 120 'get next letter
350 IF NOT(Y=25 AND X 35) THEN 400 'erase
352 GOTO 900
400 PRINT "ERROR":BEEP:GOTO 10000
500 GOSUB 9500 'print 12 lines of text
513 LOCATE 13,1:PRINT SPACE$(40);
514 LOCATE 14,1:PRINT SPACE$(40);
520 SCRN$="xe":R%=15:C%=1:O%=0:L%=880:SH%=&H3D:SL%=0:DEF SEG=&HBBA0
521 CALL DISPLAY%(SH%,SL%,O%,L%,R%,C%)
530 ER=LR:EC=1+LEN(TXT$(ER))
531 TY=NR:LOCATE TY,EC
533 INS=0 : CAP=0 : DELWRD=0 :INSWRD=0 :POSCUR=0
534 LTXT$=TXT$(ER)
535 IF POSCUR=1 THEN LOCATE TY,EC
537 ALPHA=0
540 GOSUB 4000 :IF Y 13 THEN TY=Y:ER=LR-NR+TY:EC=X
541 IF Y=23 AND X 20 AND X 24 THEN 533 'end of delete_word or insert_word
542 IF Y=15 AND X 33 THEN POSCUR=0:DELWRD=0:GOTO 95 'return to main screen
543 IF Y=15 AND X 25 AND X 30 THEN 11000
544 IF Y=15 AND X 18 AND X 24 THEN FOR I=1 TO CR:LPRINT TXT$(I):NEXT :GOTO 533 '
print
545 IF Y=15 AND X 16 THEN POSCUR=1:DELWRD=0:CAP=0:INS=0:LOCATE 15,1:GOTO 540
546 IF Y=17 AND X 36 THEN IF LR 1 THEN LR=LR-1:GOTO 500 ELSE GOTO 500
547 IF Y=19 AND X 35 THEN IF LR CR THEN LR=LR+1:GOTO 500 ELSE GOTO 500
548 IF Y=17 AND X 29 AND X 33 THEN IF CR 12 THEN LR=CR:GOTO 500 ELSE LR=12:GOTO
500
549 IF Y=19 AND X 28 AND X 35 THEN LR=CR:GOTO 500
550 IF DELWRD=1 AND Y 13 THEN 700 'delete word
551 IF NOT(Y 13 AND CAP=1) THEN 555 'capitalize
552 MID$(TXT$(ER),EC)=CHR$(SCREEN(Y,X)-32)
554 LOCATE TY,1:PRINT TXT$(ER); :LOCATE 23,25: GOTO 535
555 IF NOT(Y 13 AND POSCUR=1) THEN 560 'position cursor on edit screen
557 ER=LR-NR+TY:EC=X
559 GOTO 535
560 IF NOT(X 14 AND Y=19) THEN 565 'delete character
562 IF Y=19 THEN TXT$(ER)=LEFT$(TXT$(ER),EC-1)+RIGHT$(TXT$(ER),LEN(TXT$(ER))-EC)

563 LOCATE TY,1:PRINT TXT$(ER);
564 GOTO 535
565 IF NOT(X 14 AND Y=17) THEN 570 'insert character
566 INS=1 '1=insert 0=no insert
567 LOCATE 17,1:FOR I=1 TO 500:NEXT:LOCATE TY,EC
568 GOTO 535
```

```
570 IF NOT(Y=23 AND X 24 AND X 28) THEN 575 'Cap
572 CAP=1 : DELWRD=0 : LOCATE 23,25 :GOTO 540
575 IF NOT(Y=23 AND X 28 AND X 32) THEN 580 'Par
577 GOTO 950
580 IF NOT(X 15 AND X 27 AND Y=19) THEN 590 'set delwrd
582 DELWRD=1:CAP=0:POSCUR=0
584 LOCATE 19,16
586 GOTO 535
590 IF NOT(X 15 AND X 27 AND Y=17) THEN 600
592 INSWRD=1
594 LOCATE 17,16
596 GOTO 800
600 IF NOT(Y 13) THEN 610 'add wrd
601 IF X 20 THEN ALPHA=1
602 GOSUB 5000 'get word
604 GOSUB 6000 'check end of line
606 GOSUB 8000 'add wrd to text
608 GOTO 500
610 SL=SCREEN(Y,X):IF SL=32 AND X 40 THEN X=X+1 'alpha char replaces text char
611 IF X 20 THEN ALPHA=1
612 'IF X 20 THEN EC=LEN(TXT$(ER))
613 IF Y=23 AND X 32 THEN TXT$(ER)=LEFT$(TXT$(ER),EC-1)+" "+RIGHT$(TXT$(ER),LEN(
TXT$(ER))-(EC-INS)):GOTO 616
614 TXT$(ER)=LEFT$(TXT$(ER),EC-1)+CHR$(SCREEN(Y,X)+32*ALPHA)+RIGHT$(TXT$(ER),LEN
(TXT$(ER))-(EC-INS))
616 LOCATE TY,1:PRINT TXT$(ER);
617 EC=EC+1
618 GOTO 535
700 GOSUB 5000 'get word & nl & pl
705 ER=LR-NR+TY
710 TXT$(ER)=LEFT$(TXT$(ER),X-PL)+RIGHT$(TXT$(ER),LEN(TXT$(ER))-(X+NL))
720 LOCATE TY,1 : PRINT SPACE$(40);
730 LOCATE TY,1 : PRINT TXT$(ER);
740 LOCATE 19,16
750 GOTO 540 'get pen (next word to del)
800 ' insert
810 LOCATE 13,1:PRINT "After which word?";
820 GOSUB 4000
822 ER=LR-NR+Y
825 GOSUB 5000
830 GOSUB 2000
840 FOR RL%=1 TO 4:X$=SPACE$(39):CALL FPRINT%(RL%,C%,X$):NEXT
845 RL%=1 : X$=LEFT$(TXT$(ER),X+NL):CALL FPRINT%(RL%,C%,X$)
850 LOCATE 1,X+NL+1
855 OCR=CR : OTXT$(1)=" "+RIGHT$(TXT$(ER),LEN(TXT$(ER))-(X+NL))
860 NOR=CR-ER : IF NOR 1 THEN 870
865 FOR I=1 TO NOR : OTXT$(I+1)=TXT$(ER+I) : NEXT
870 CR=ER : TXT$(CR)=X$
878 GOTO 95
880 INSWRD=0
882 I=1:OC=1
884 WHILE(I NOR+2)
886 NOC=INSTR(OC+1,OTXT$(I)," ")
887 IF NOC=0 THEN NOC=LEN(OTXT$(I)):BI=1:GOTO 894
888 WRD$=MID$(OTXT$(I),OC+1,NOC-OC-1)
890 GOSUB 6000
892 GOSUB 8000
893 OC=NOC
894 IF BI=1 THEN I=I+1:BI=0:OC=1
895 WEND
898 GOSUB 9000
899 GOTO 100
900 '            erase
910 CR=LCR
920 IF PWRD$="" THEN TXT$(CR)=LTXT$
925 IF PWRD$ "" THEN LPW=LEN(PWRD$):GOSUB 3000:PRINT SPACE$(LPW):GOSUB 3000:PWR
D$=LEFT$(PWRD$,LPW-1):GOSUB 3000:PRINT PWRD$:GOSUB 3500:GOTO 120
930 GOSUB 9000 'print text
940 GOTO 100
950 ' paragraph
952 LOCATE 13,1:PRINT "After which word?";
954 GOSUB 4000
956 ER=LR-NR+Y
```

```
958  GOSUB 5000
959  X$=LEFT$(TXT$(ER),X+NL)
960  OCR=CR : OTXT$(1)="    "+RIGHT$(TXT$(ER),LEN(TXT$(ER))-(X+NL))
962  NOR=CR-ER : IF NOR 1 THEN 970
965  FOR I=1 TO NOR : OTXT$(I+1)=TXT$(ER+I) : NEXT
970  CR=ER : TXT$(CR)=X$+SPACE$(39-LEN(X$))
982  I=1:OC=1
984  WHILE(I NOR+2)
986  NOC=INSTR(OC+1,OTXT$(I)," ")
987  IF NOC=0 THEN NOC=LEN(OTXT$(I)):BI=1:GOTO 994
988  WRD$=MID$(OTXT$(I),OC+1,NOC-OC-1)
990  GOSUB 6000
992  GOSUB 8000
993  OC=NOC
994  IF BI=1 THEN I=I+1:BI=0:OC=1
995  WEND
999  GOTO 500
1000 '            save last 3 lines of text and calculate txt row for cap
1100 NR=3:IF CR NR THEN NR=CR
1200 FOR I=1 TO NR:LTXT$(I)=TXT$(CR+Y-NR):NEXT
1300 RETURN
2000 '            display main screen
2100 SCRN$="x":R%=5:C%=1:O%=0:L%=600:SH%=&H18:SL%=0:DEF SEG=&HBBA0
2200 CALL DISPLAY%(SH%,SL%,O%,L%,R%,C%)
2300 RETURN
3000 '            position cursor
3100 RW=CR:IF RW 3 THEN RW=3
3200 CL=LEN(TXT$(CR))+1
3250 IF INSWRD=1 THEN RW=2
3300 LOCATE RW,CL
3400 RETURN
3500 '            position cursor pwrd
3600 RW=CR:IF RW 3 THEN RW=3
3700 CL=LEN(TXT$(CR))+1+LEN(PWRD$)
3800 LOCATE RW,CL
3900 RETURN
4000 '            get pen
4100 LY=Y:LX=X
4150 PEN ON
4200 IF PEN(0)=0 THEN 4200
4300 Y=PEN(8):X=PEN(9):PEN OFF
4400 IF X 1 OR X 80 OR Y 1 OR Y 25 OR Y=22 OR Y=24 THEN 4100
4410 IF Y=LY AND X=LX AND (Y 25 OR X 26 OR X 30) AND TIME-LSTPNT DELAY THEN 4150
4420 IF SCREEN(Y,X)=32 AND X 40 THEN X=X+1 : IF SCREEN(Y,X)=32 THEN 4100 ELSE RETURN
4430 LSTPNT=TIME
4450 RETURN
4500 '            put word on a screen 15 column
4510 AFL=ASC(LEFT$(WRD$,1))
4520 IF AFL 97 THEN AFL=AFL+32
4550 ON AFL-96 GOTO 4601,4602,4603,4604,4605,4606,4607,4608,4609,4610,4611,4612,4613,4614,4615,4616,4617,4618,4619,4620,4621,4622,4623,4624,4625,4626
4601 A15$(A15)=RNKWRD$:A15=A15+1:GOTO 4700
4602 B15$(B15)=RNKWRD$:B15=B15+1:GOTO 4700
4603 C15$(C15)=RNKWRD$:C15=C15+1:GOTO 4700
4604 D15$(D15)=RNKWRD$:D15=D15+1:GOTO 4700
4605 E15$(E15)=RNKWRD$:E15=E15+1:GOTO 4700
4606 F15$(F15)=RNKWRD$:F15=F15+1:GOTO 4700
4607 G15$(G15)=RNKWRD$:G15=G15+1:GOTO 4700
4608 H15$(H15)=RNKWRD$:H15=H15+1:GOTO 4700
4609 I15$(I15)=RNKWRD$:I15=I15+1:GOTO 4700
4610 J15$(J15)=RNKWRD$:J15=J15+1:GOTO 4700
4611 K15$(K15)=RNKWRD$:K15=K15+1:GOTO 4700
4612 L15$(L15)=RNKWRD$:L15=L15+1:GOTO 4700
4613 M15$(M15)=RNKWRD$:M15=M15+1:GOTO 4700
4614 N15$(N15)=RNKWRD$:N15=N15+1:GOTO 4700
4615 O15$(O15)=RNKWRD$:O15=O15+1:GOTO 4700
4616 P15$(P15)=RNKWRD$:P15=P15+1:GOTO 4700
4617 Q15$(Q15)=RNKWRD$:Q15=Q15+1:GOTO 4700
4618 R15$(R15)=RNKWRD$:R15=R15+1:GOTO 4700
4619 S15$(S15)=RNKWRD$:S15=S15+1:GOTO 4700
4620 T15$(T15)=RNKWRD$:T15=T15+1:GOTO 4700
```

```
4621 U15$(U15)=RNKWRD$:U15=U15+1:GOTO 4700
4622 V15$(V15)=RNKWRD$:V15=V15+1:GOTO 4700
4623 W15$(W15)=RNKWRD$:W15=W15+1:GOTO 4700
4624 GOTO 400
4625 Y15$(Y15)=RNKWRD$:Y15=Y15+1:GOTO 4700
4626 Z15$(Z15)=RNKWRD$:Z15=Z15+1:GOTO 4700
4700 RETURN
4800 ON ASC(WRD$)-64 GOTO 4901,4902,4903,4904,4905,4906,4907,4908,4909,4910,4911
,4912,4913,4914,4915,4916,4917,4918,4919,4920,4921,4922,4923,4924,4925,4926
4901 FOR I=0 TO A15:LOCATE I+5,31:PRINT LEFT$(A15$(I),10);:NEXT :GOTO 4950
4902 FOR I=0 TO B15:LOCATE I+5,31:PRINT LEFT$(B15$(I),10);:NEXT :GOTO 4950
4903 FOR I=0 TO C15:LOCATE I+5,31:PRINT LEFT$(C15$(I),10);:NEXT :GOTO 4950
4904 FOR I=0 TO D15:LOCATE I+5,31:PRINT LEFT$(D15$(I),10);:NEXT :GOTO 4950
4905 FOR I=0 TO E15:LOCATE I+5,31:PRINT LEFT$(E15$(I),10);:NEXT :GOTO 4950
4906 FOR I=0 TO F15:LOCATE I+5,31:PRINT LEFT$(F15$(I),10);:NEXT :GOTO 4950
4907 FOR I=0 TO G15:LOCATE I+5,31:PRINT LEFT$(G15$(I),10);:NEXT :GOTO 4950
4908 FOR I=0 TO H15:LOCATE I+5,31:PRINT LEFT$(H15$(I),10);:NEXT :GOTO 4950
4909 FOR I=0 TO I15:LOCATE I+5,31:PRINT LEFT$(I15$(I),10);:NEXT :GOTO 4950
4910 FOR I=0 TO J15:LOCATE I+5,31:PRINT LEFT$(J15$(I),10);:NEXT :GOTO 4950
4911 FOR I=0 TO K15:LOCATE I+5,31:PRINT LEFT$(K15$(I),10);:NEXT :GOTO 4950
4912 FOR I=0 TO L15:LOCATE I+5,31:PRINT LEFT$(L15$(I),10);:NEXT :GOTO 4950
4913 FOR I=0 TO M15:LOCATE I+5,31:PRINT LEFT$(M15$(I),10);:NEXT :GOTO 4950
4914 FOR I=0 TO N15:LOCATE I+5,31:PRINT LEFT$(N15$(I),10);:NEXT :GOTO 4950
4915 FOR I=0 TO O15:LOCATE I+5,31:PRINT LEFT$(O15$(I),10);:NEXT :GOTO 4950
4916 FOR I=0 TO P15:LOCATE I+5,31:PRINT LEFT$(P15$(I),10);:NEXT :GOTO 4950
4917 FOR I=0 TO Q15:LOCATE I+5,31:PRINT LEFT$(Q15$(I),10);:NEXT :GOTO 4950
4918 FOR I=0 TO R15:LOCATE I+5,31:PRINT LEFT$(R15$(I),10);:NEXT :GOTO 4950
4919 FOR I=0 TO S15:LOCATE I+5,31:PRINT LEFT$(S15$(I),10);:NEXT :GOTO 4950
4920 FOR I=0 TO T15:LOCATE I+5,31:PRINT LEFT$(T15$(I),10);:NEXT :GOTO 4950
4921 FOR I=0 TO U15:LOCATE I+5,31:PRINT LEFT$(U15$(I),10);:NEXT :GOTO 4950
4922 FOR I=0 TO V15:LOCATE I+5,31:PRINT LEFT$(V15$(I),10);:NEXT :GOTO 4950
4923 FOR I=0 TO W15:LOCATE I+5,31:PRINT LEFT$(W15$(I),10);:NEXT :GOTO 4950
4924 GOTO 400
4925 FOR I=0 TO Y15:LOCATE I+5,31:PRINT LEFT$(Y15$(I),10);:NEXT :GOTO 4950
4926 FOR I=0 TO Z15:LOCATE I+5,31:PRINT LEFT$(Z15$(I),10);:NEXT :GOTO 4950
4950 RETURN
5000 '         get word from screen
5100 SL=SCREEN(Y,X):IF SL=32 AND X 40 THEN X=X+1
5200 WRD$=CHR$(SCREEN(Y,X)):NL=0
5300 NL=NL+1:IF X+NL 40 THEN 5600
5400 SNL=SCREEN(Y,X+NL):IF SNL=32 THEN 5600
5500 WRD$=WRD$+CHR$(SNL):GOTO 5300
5600 PL=0
5700 PL=PL+1:IF X-PL 1 THEN RETURN
5800 SPL=SCREEN(Y,X-PL):IF SPL=32 THEN RETURN
5900 WRD$=CHR$(SPL)+WRD$:GOTO 5700
6000 '         check end of line
6100 IF LEN(WRD$)+LEN(TXT$(CR)) 38 THEN LCR=CR:CR=CR+1:TXT$(CR)=" "
6200 RETURN
6500 '         check end of line with pwrd
6600 IF LEN(PWRD$)+LEN(TXT$(CR)) 38 THEN LCR=CR:CR=CR+1:TXT$(CR)=" "
6700 GOSUB 9000 'print text
6800 RETURN
7000 '         display A-screen
7100 DISP=38*INSTR(UCALPH$,WRD$)
7200 SH%=&H18+DISP 256
7300 SL%=DISP MOD 256
7400 CALL DISPLAY%(SH%,SL%,O%,L%,R%,C%)
7425 GOSUB 4800
7450 RETURN
7500 '         display AB-screen
7510 DISP1=0 : DISP2=0
7550 TW$=PWRD$+CHR$(ASC(WRD$)+32)
7600 DISP1=38*(INSTR(TWOLET1$,TW$)-1)/3
7610 DISP=DISP1
7620 IF DISP1 0 THEN DISP2=38*(INSTR(TWOLET2$,TW$)-1)/3 : DISP=79*38+DISP2
7650 IF DISP2 0 THEN RETURN
7700 SH%=&H20+DISP 256
7800 SL%=DISP MOD 256
7900 CALL DISPLAY%(SH%,SL%,O%,L%,R%,C%)
7950 RETURN
8000 '         add wrd$ to txt$(cr) & save old txt$(cr)
```

```
8050 LCR=CR
8100 LTXT$=TXT$(CR):TXT$(CR)=TXT$(CR)+WRD$+" "
8200 RETURN
8500 '            display ABCscreen
8550 TW$=PWRD$+CHR$(ASC(WRD$)+32)
8555 IF TW$="con" THEN TW$="cox"
8600 DISP=38*(INSTR(THRLET$,TW$)-1)/4
8650 IF DISP 0 THEN RETURN
8700 SH%=&H38+DISP 256
8800 SL%=DISP MOD 256
8900 CALL DISPLAY%(SH%,SL%,O%,L%,R%,C%)
8950 RETURN
8990 '            display "cont" screen
8992 SH%=&H3B
8994 SL%=0
8996 CALL DISPLAY%(SH%,SL%,O%,L%,R%,C%)
8998 RETURN
9000 '            print text
9100 FOR RL%=1 TO 4:X$=SPACE$(39):CALL FPRINT%(RL%,C%,X$):NEXT
9150 IF INSWRD=1 THEN 9400
9200 NR=3:IF CR NR THEN NR=CR
9300 FOR RL%=1 TO NR:X$=TXT$(CR-NR+RL%):CALL FPRINT%(RL%,C%,X$):NEXT
9350 RETURN
9400 '   insert
9410 RL%=1:X$=TXT$(CR):CALL FPRINT%(RL%,C%,X$)
9430 RL%=3:X$=OTXT$(1):CALL FPRINT%(RL%,C%,X$)
9450 RETURN
9500 '            print 12 lines text
9600 FOR RL%=1 TO 12:X$=SPACE$(39):CALL FPRINT%(RL%,C%,X$):NEXT
9700 NR=12:IF CR NR THEN NR=CR
9750 IF LR NR THEN LR=NR
9800 FOR RL%=1 TO NR:X$=TXT$(LR-NR+RL%):CALL FPRINT%(RL%,C%,X$):NEXT
9850 FOR RL%=NR+1 TO 12:X$=SPACE$(39):CALL FPRINT%(RL%,C%,X$):NEXT
9900 RETURN
10000 BEEP:CLS:LOCATE 11,11:COLOR 31,0:PRINT "Error, try again";: FOR I=1 TO 1500
0:NEXT :CLS:COLOR 7,0 : RESUME 95
11000 LOCATE 13,1:PRINT "Spell Title";
11050 WRD$="":TITLE$=""
11100 WHILE (NOT(Y=23 AND X 20 AND X 24))
11200 GOSUB 4000
11300 GOSUB 5000
11350 IF WRD$="end" THEN 11500
11400 TITLE$=TITLE$+WRD$
11500 LOCATE 13,15:PRINT TITLE$;
11600 WEND
11700 OPEN TITLE$+".txt" FOR OUTPUT AS 1
11800 FOR I=1 TO CR:PRINT #1,TXT$(I):NEXT
11900 'DEF SEG=&H3F00:BSAVE"rnklst",0,&H90
12000 OPEN "col15.txt" FOR OUTPUT AS 2
12010 PRINT #2,A15:FOR I=1 TO A15:PRINT #2,A15$(I):NEXT
12020 PRINT #2,B15:FOR I=1 TO B15:PRINT #2,B15$(I):NEXT
12030 PRINT #2,C15:FOR I=1 TO C15:PRINT #2,C15$(I):NEXT
12040 PRINT #2,D15:FOR I=1 TO D15:PRINT #2,D15$(I):NEXT
12050 PRINT #2,E15:FOR I=1 TO E15:PRINT #2,E15$(I):NEXT
12060 PRINT #2,F15:FOR I=1 TO F15:PRINT #2,F15$(I):NEXT
12070 PRINT #2,G15:FOR I=1 TO G15:PRINT #2,G15$(I):NEXT
12080 PRINT #2,H15:FOR I=1 TO H15:PRINT #2,H15$(I):NEXT
12090 PRINT #2,I15:FOR I=1 TO I15:PRINT #2,I15$(I):NEXT
12100 PRINT #2,J15:FOR I=1 TO J15:PRINT #2,J15$(I):NEXT
12110 PRINT #2,K15:FOR I=1 TO K15:PRINT #2,K15$(I):NEXT
12120 PRINT #2,L15:FOR I=1 TO L15:PRINT #2,L15$(I):NEXT
12130 PRINT #2,M15:FOR I=1 TO M15:PRINT #2,M15$(I):NEXT
12140 PRINT #2,N15:FOR I=1 TO N15:PRINT #2,N15$(I):NEXT
12150 PRINT #2,O15:FOR I=1 TO O15:PRINT #2,O15$(I):NEXT
12160 PRINT #2,P15:FOR I=1 TO P15:PRINT #2,P15$(I):NEXT
12170 PRINT #2,Q15:FOR I=1 TO Q15:PRINT #2,Q15$(I):NEXT
12180 PRINT #2,R15:FOR I=1 TO R15:PRINT #2,R15$(I):NEXT
12190 PRINT #2,S15:FOR I=1 TO S15:PRINT #2,S15$(I):NEXT
12200 PRINT #2,T15:FOR I=1 TO T15:PRINT #2,T15$(I):NEXT
12210 PRINT #2,U15:FOR I=1 TO U15:PRINT #2,U15$(I):NEXT
12220 PRINT #2,V15:FOR I=1 TO V15:PRINT #2,V15$(I):NEXT
12230 PRINT #2,W15:FOR I=1 TO W15:PRINT #2,W15$(I):NEXT
12250 PRINT #2,Y15:FOR I=1 TO Y15:PRINT #2,Y15$(I):NEXT
```

```
12260 PRINT #2,Z15:FOR I=1 TO Z15:PRINT #2,Z15$(I):NEXT
12900 LOCATE 13,25:PRINT "It's been fun"
12999 END
18000 CLOSE #1
18002 OPEN "col15.txt" FOR INPUT AS 2
18010 INPUT#2,A15:FOR I=1 TO A15:INPUT#2,A15$(I):NEXT
18020 INPUT#2,B15:FOR I=1 TO B15:INPUT#2,B15$(I):NEXT
18030 INPUT#2,C15:FOR I=1 TO C15:INPUT#2,C15$(I):NEXT
18040 INPUT#2,D15:FOR I=1 TO D15:INPUT#2,D15$(I):NEXT
18050 INPUT#2,E15:FOR I=1 TO E15:INPUT#2,E15$(I):NEXT
18060 INPUT#2,F15:FOR I=1 TO F15:INPUT#2,F15$(I):NEXT
18070 INPUT#2,G15:FOR I=1 TO G15:INPUT#2,G15$(I):NEXT
18080 INPUT#2,H15:FOR I=1 TO H15:INPUT#2,H15$(I):NEXT
18090 INPUT#2,I15:FOR I=1 TO I15:INPUT#2,I15$(I):NEXT
18100 INPUT#2,J15:FOR I=1 TO J15:INPUT#2,J15$(I):NEXT
18110 INPUT#2,K15:FOR I=1 TO K15:INPUT#2,K15$(I):NEXT
18120 INPUT#2,L15:FOR I=1 TO L15:INPUT#2,L15$(I):NEXT
18130 INPUT#2,M15:FOR I=1 TO M15:INPUT#2,M15$(I):NEXT
18140 INPUT#2,N15:FOR I=1 TO N15:INPUT#2,N15$(I):NEXT
18150 INPUT#2,O15:FOR I=1 TO O15:INPUT#2,O15$(I):NEXT
18160 INPUT#2,P15:FOR I=1 TO P15:INPUT#2,P15$(I):NEXT
18170 INPUT#2,Q15:FOR I=1 TO Q15:INPUT#2,Q15$(I):NEXT
18180 INPUT#2,R15:FOR I=1 TO R15:INPUT#2,R15$(I):NEXT
18190 INPUT#2,S15:FOR I=1 TO S15:INPUT#2,S15$(I):NEXT
18200 INPUT#2,T15:FOR I=1 TO T15:INPUT#2,T15$(I):NEXT
18210 INPUT#2,U15:FOR I=1 TO U15:INPUT#2,U15$(I):NEXT
18220 INPUT#2,V15:FOR I=1 TO V15:INPUT#2,V15$(I):NEXT
18230 INPUT#2,W15:FOR I=1 TO W15:INPUT#2,W15$(I):NEXT
18250 INPUT#2,Y15:FOR I=1 TO Y15:INPUT#2,Y15$(I):NEXT
18260 INPUT#2,Z15:FOR I=1 TO Z15:INPUT#2,Z15$(I):NEXT
18800 CLOSE #2
18900 GOTO 90
```

What is claimed is:

1. A method of creating text using a computer having a memory, at least one display screen and means for selecting positions on said screen, said method comprising the steps of:
   (a) storing in said memory a dictionary of frequently used linguistic expressions, at least some of said linguistic expressions having a plurality of alphanumeric characters;
   (b) displaying on a first section of said screen a plurality of said linguistic expressions arranged in a predetermined order for selection by a user;
   (c) displaying on a second section of said screen at least one line of text, as said text is created by a user;
   (d) identifying the position of a linguistic expression on said first section of said screen, in response to selection of that position by a user with said position selecting means; and
   (e) displaying the linguistic expression, whose position was identified in step (d), in said second section of said screen, concatenated to the end of said line of text, thereby adding a linguistic expression to said line of text.

2. The method defined in claim 1, wherein some of said linguistic expressions each comprise a single alphanumeric character.

3. The method defined in claim 2, wherein said single alphanumeric characters are displayed on said first section of said screen arranged in the order they appear on a "QWERTY" keyboard.

4. The method defined in claim 1, wherein said predetermined order includes alphabetic order.

5. The method defined in claim 1, wherein step (b) includes the step of displaying a list of words of a given language, which are the words most likely to be selected by the user.

6. The method defined in claim 1, further comprising the additional step of identifying, in sequence, at least one alphanumeric character selected by a user, and wherein step (b) includes the step of displaying on said first section of said screen a plurality of said linguistic expressions which begin with said at least one alphanumeric character identified in said additional step in the character sequence selected by the user.

7. The method defined in claim 6, wherein said at least one alphanumeric character is selected by a user by typing on a keyboard, and wherein said additional step includes the step of receiving typed commands from said keyboard.

8. The method defined in claim 6, wherein some of said linguistic expressions each comprise an alphanumeric character and wherein said at least one alphanumeric character is selected by a user by identifying its position on said first section of said screen with said position selecting means.

9. The method defined in claim 1, wherein said means for selecting positions on said screen comprises a pointing mechanism.

10. The method defined in claim 9, wherein said pointing mechanism is a light pen.

11. The method defined in claim 9, wherein said pointing mechanism is a touch-sensitive display.

* * * * *